United States Patent
Zhang et al.

(10) Patent No.: US 10,502,858 B2
(45) Date of Patent: Dec. 10, 2019

(54) METHOD AND SYSTEM FOR FORMATION TEXTURE AND ROCK TYPE IDENTIFICATION

(71) Applicant: Schlumberger Technology Corporation, Sugar Land, TX (US)

(72) Inventors: Tianhua Zhang, Clamart (FR); Yong-Hua Chen, Belmont, MA (US); Robert Laronga, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 321 days.

(21) Appl. No.: 15/333,835

(22) Filed: Oct. 25, 2016

(65) Prior Publication Data
US 2017/0160421 A1 Jun. 8, 2017

(30) Foreign Application Priority Data
Dec. 4, 2015 (EP) .................................. 15290301

(51) Int. Cl.
*G01V 3/20* (2006.01)
*E21B 49/00* (2006.01)
(Continued)

(52) U.S. Cl.
CPC ............ *G01V 3/20* (2013.01); *E21B 47/0002* (2013.01); *E21B 49/00* (2013.01); *G01V 3/24* (2013.01)

(58) Field of Classification Search
CPC ........ G01V 3/20; G01V 3/24; E21B 47/0002; E21B 49/00
See application file for complete search history.

(56) References Cited

U.S. PATENT DOCUMENTS

| | | | |
|---|---|---|---|
| 8,754,651 B2 | 6/2014 | Habashy et al. | |
| 2007/0061082 A1* | 3/2007 | Seleznev | G01V 3/26 702/11 |

(Continued)

OTHER PUBLICATIONS

Chen et al., "Inversion-Based Workflow for Quantitative Interpretation of the New-Generation Oil-Based Mud Resistivity Image", SPWLA Annual Logging Symposium, May 18-22, 2014.*

(Continued)

*Primary Examiner* — Mohamed Charioui
*Assistant Examiner* — Catherine T. Rastovski
(74) *Attorney, Agent, or Firm* — Sara K. M. Hinkley

(57) ABSTRACT

In one embodiment, a method includes receiving, via a processor, data from a plurality of imaging buttons disposed on a downhole tool within a borehole, generating, via the processor, a resistivity image, a permittivity image, a standoff curve, a rugosity index curve, a high-resolution image of a relationship between resistivity and permittivity of a section of a geological formation measured by the downhole tool, or some combination thereof based on the data, characterizing, via the processor, one or more vugs, one or more fractures, or some combination thereof based at least on the resistivity image, the permittivity image, the standoff curve, the rugosity index curve, the high-resolution image of the relationship between resistivity and permittivity, or some combination thereof, and identifying, via the processor, one or more rock types based at least on the high-resolution image of the relationship between resistivity and permittivity.

15 Claims, 10 Drawing Sheets

(51) Int. Cl.
*E21B 47/00* (2012.01)
*G01V 3/24* (2006.01)

(56) References Cited

U.S. PATENT DOCUMENTS

| | | | |
|---|---|---|---|
| 2009/0259446 A1* | 10/2009 | Zhang | E21B 49/00 703/2 |
| 2009/0309601 A1 | 12/2009 | Simon | |
| 2010/0295548 A1 | 11/2010 | Georgi et al. | |
| 2011/0114309 A1 | 5/2011 | Bloemenkamp et al. | |
| 2011/0241690 A1* | 10/2011 | Hayman | G01V 3/24 324/355 |
| 2014/0191762 A1 | 7/2014 | Chen et al. | |
| 2014/0239960 A1 | 8/2014 | Habashy et al. | |
| 2015/0260874 A1 | 9/2015 | Chen et al. | |
| 2018/0003853 A1* | 1/2018 | Ewe | G01V 3/28 |

OTHER PUBLICATIONS

R. Bloemenkamp et al, Design and Field Testing of a New High-definition Microresistivity Imaging Tool Engineered for Oil-Based Mud, SPWLA 55th Annual Logging Symposium, May 18-22, 2014 (25 pages).

W. E. Kenyon, Texture effects on megahertz dielectric properties of calcite rock samples, J. Appl. Phys 55 (8), 15, Apr. 1984 (8 pages).

Y. Chen et al, Inversion-based Workflow for Quantitative Interpretation of the New-Generation Oil-Based Mud Resistivity Imager, SPWLA 55th Annual Logging Symposium, May 18-22, 2014 (24 pages).

M. Hizem et al, Dielectric Dispersion: A new wireline petrophysical measurement, SPE 116130, SPE Annual Technical Conference and Exhibition held in Denver, Colorado, USA, Sep. 21-24, 2008 (21 pages).

Extended European Search Report issued in the related EP Application 15290301.9, dated Jun. 10, 2016 (8 pages).

* cited by examiner

| PERMITTIVITY/<br>PHASE ANGEL | -90 DEG | -86 DEG | -82 DEG | -78 DEG | -74 DEG | -70 DEG |
|---|---|---|---|---|---|---|
| 5 | 1.25 | 0.65 | 0.58 | 0.54 | 0.51 | 0.49 |
| 7 | 1.75 | 0.86 | 0.77 | 0.71 | 0.67 | 0.64 |
| 9 | 2.25 | 1.07 | 0.94 | 0.87 | 0.82 | 0.78 |
| 11 | 2.75 | 1.26 | 1.11 | 1.03 | 0.97 | 0.92 |
| 17 | 4.25 | 1.80 | 1.58 | 1.45 | 1.36 | 1.29 |
| 25 | 6.25 | 2.47 | 2.15 | 1.96 | 1.84 | 1.74 |

METHOD AND SYSTEM FOR FORMATION TEXTURE AND ROCK TYPE IDENTIFICATION

CROSS-REFERENCE TO RELATED APPLICATIONS

The present invention claims the benefits of European Patent Application No. 15290301.9, filed on Dec. 4, 2015, titled "Method and System for Formation Texture and Rock Type Identification," the entire content of which is hereby incorporated by reference into the current application.

BACKGROUND

This disclosure relates to a method and system for identifying subsurface formation textures and rock types included in the subsurface formation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Wells are generally drilled into a surface (land-based) location or ocean bed to recover natural deposits of oil and natural gas, as well as other natural resources that are trapped in geological formations. A well may be drilled using a drill bit attached to the lower end of a "drill string," which includes a drill-pipe, a bottom hole assembly, and other components that facilitate turning the drill bit to create a borehole. For oil and gas exploration and/or monitoring, it may be desirable to obtain information about the subsurface formations that are penetrated by a borehole for analysis. More specifically, this may include obtaining downhole measurements and generating images that visualize characteristics of the subsurface formations.

Petrophysical rock typing attempts to divide reservoir rocks into classes having similar flow behavior. Subdivision into classes is based on characteristics such as mineralogy, lithology, porosity and pore structure that can be investigated via downhole measurements, thin section and core description, and the use of outcrop analogs, to name a few techniques. For example, geochemical logs are one category of downhole measurement providing important information on mineralogy and lithology. However, like many logging techniques, these data may be averaged over the sensitive volume of the measurement, on the order of one foot vertically, and azimuthally from all sides of the borehole. This implies that heterogeneous distribution patterns around the borehole may not be captured. While low frequency electrical imaging tools can provide details of heterogeneous resistivity distribution around the borehole, the relationship between resistivity and rock type or texture may not be apparent.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

Systems and methods are provided for identification of geological formations and rock types included in the geological formations. An example of a method includes acquiring, into a processor, data in the MHz range from an array of sensors on a downhole tool and computing, using the processor and new processing algorithms in the processor, one or more characteristics (e.g., resistivity, permitivity, the relationship between resistivity and permitivity, standoff, and/or a rugosity index) of the formation to produce multi-dimensional high azimuthal and vertical resolution images of texture distribution, lithological indicators, and rock type information. Using the images, the processor may characterize vugs (e.g., open or closed to well surface), fractures of the well surface, and/or differentiate between types of rocks, among other things. One benefit of the embodiments disclosed herein is enabling extraction of high resolution and broad coverage information from downhole measurements instead of acquiring full cores during drilling and performing corresponding lab measurements.

An example of a system may include a well logging system that conveys a downhole tool into a wellbore of a formation on a cable and a data processing system. The downhole tool may include sensors that measure data in the MHz range and the data processing system may include a processor that receives the data in the MHz range. The processor may compute one or more characteristics (e.g., resistivity, permitivity, the relationship between resistivity and permitivity, standoff, and/or a rugosity index) of the formation to produce multidimensional high azimuthal and vertical resolution images of texture distribution, lithological indicators, and rock type information.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
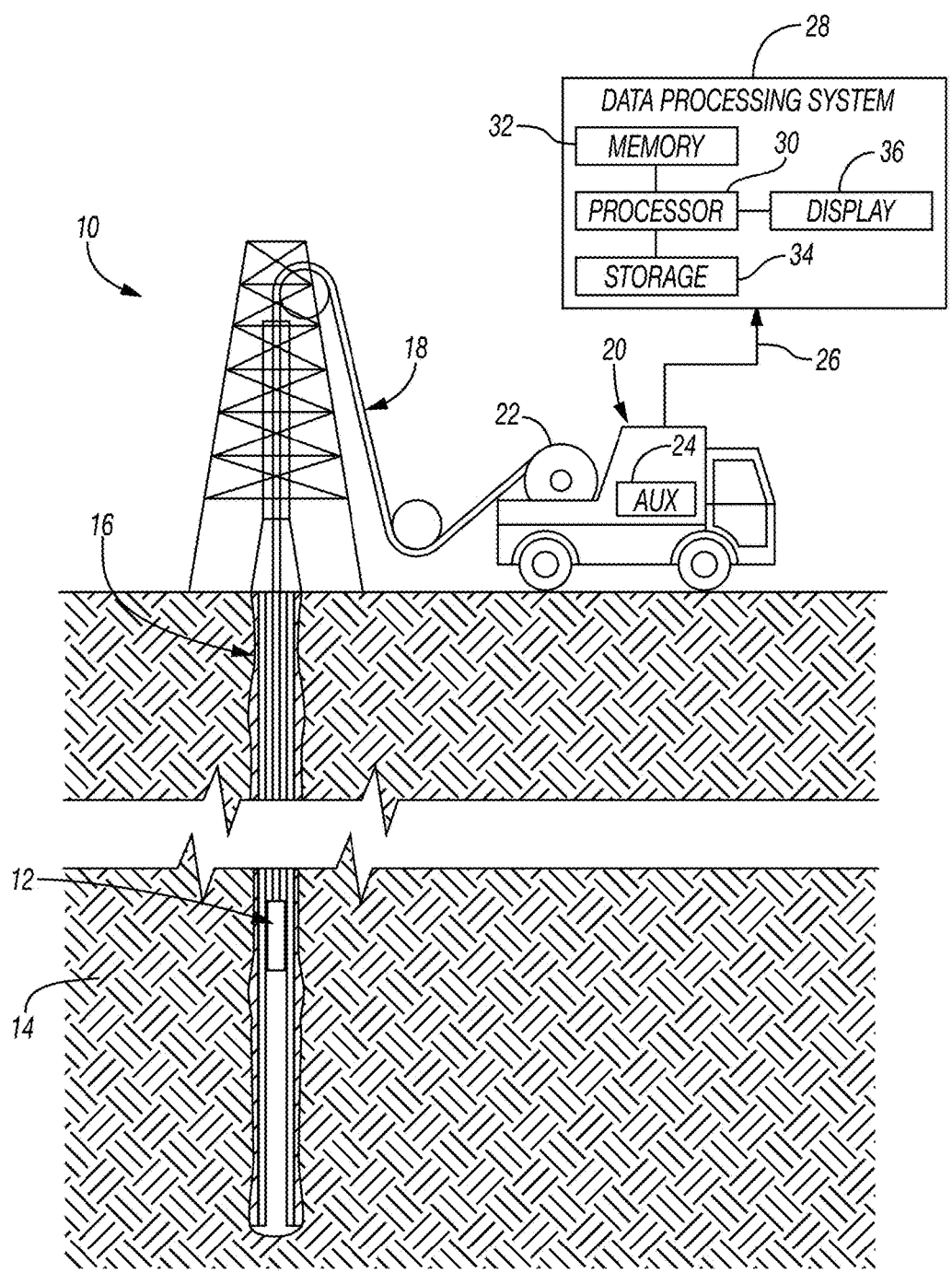
FIG. 1 is a schematic diagram of a well-logging system that employs a logging winch system, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Quantified geology may improve reservoir characterization and result in more realistic reservoir modeling. In some embodiments, in the environment of wellbores drilled with non-electrically-conductive fluids or oil-based mud (OBM), a downhole oil-based mud imaging tool, such as the QUANTA GEO (registered trademark of Schlumberger Technology Corporation) tool provided by Schlumberger Technology Corporation, may provide photograph-realistic images of the formations intersected by the well using microelectrical sensors that operate in the megahertz (MHz) range. The downhole tool may provide high resolution (e.g., 0.1-inch to 0.4-inch) electrical images in OBM, which may enable directly visualizing and quantifying thin layers, textures, and secondary porosity from the high-resolution resistivity image. At the same time, the usage of MHz range electrical techniques opens the possibility of deriving not only electrical resistivity, but also other information such as rock dielectric permittivity and button to borehole surface standoff (herein referred to as 'standoff'). Even further, some embodiments may post-process and integrate the data to obtain additional formation properties such as secondary porosity position and rock types. As such, in some embodiments, data obtained by the tool may be used to produce multi-dimensional high azimuthal and vertical resolution images of texture distribution, lithological indicators, and rock type information using one or more of the following formation characteristics: resistivity, permittivity, the relationship between resistivity and permittivity, standoff, and/or rugosity index.

With this in mind, FIG. 1 illustrates a well-logging system 10 that may employ the formation texture and rock type identification systems and methods of this disclosure. The well-logging system 10 may be used to convey a downhole tool 12 through a geological formation 14 via a wellbore 16. The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that uses electrical sensors to obtain high-resolution measurements of the wellbore 16 wall.

As discussed further below, the downhole tool 12 may include a number of sensors used to acquire data 26 about the wellbore 16 and/or geological formation 14 by taking measurements. The data 26 may be sent to a data processing system 28. The data processing system 28 may analyze the data 26 to produce multidimensional high azimuthal and vertical resolution images of texture distribution, lithological indicators, and rock type information using one or more of the following formation characteristics: resistivity, permittivity, the relationship between resistivity and permittivity (e.g., Hayman factor), standoff, and/or rugosity index. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may display the images generated by the processor 30. The data processing system 28 may be a local component of the logging winch system 20, a remote device that analyzes data from other logging winch systems 20, or partly local and partly remote. In some embodiments, the data processing system 28 may be a mobile computing device (e.g., tablet, smartphone, or laptop) or a server remote from the logging winch system 20.

Figure 2:
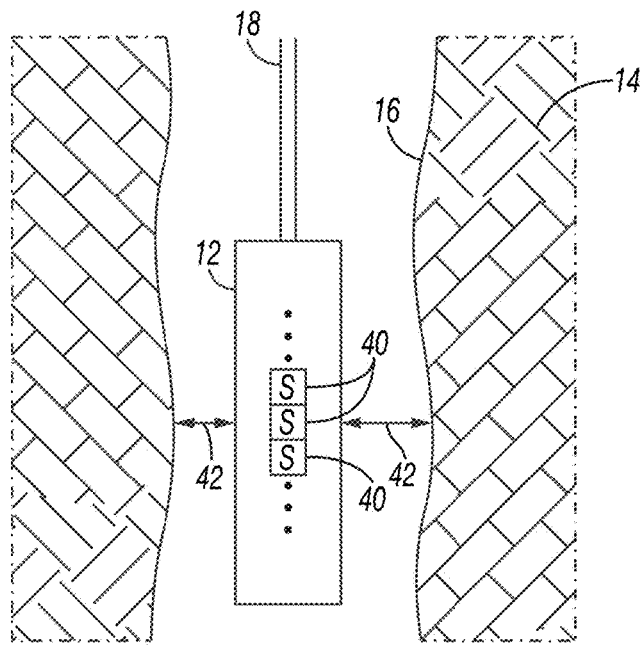
FIG. 2 is a schematic diagram of a downhole tool used by the well-logging system of FIG. 1, in accordance with an embodiment.

FIG. 2 is a schematic diagram of the downhole tool 12 used by the well-logging system 10 of FIG. 1, in accordance with an embodiment. As illustrated, the downhole tool 12 may include a number of sensors 40 that are used to measure characteristics of the formation 14. Each sensor 40 may be referred to as an imaging pad. In some embodiments, any number of imaging pads (e.g., 1, 2, 3, 4, 5, 6, 7, 8, 9, or 10) may be used. In one embodiment, 8 imaging pads may be used. In some embodiments, the imaging pads 40 may be disposed on a respective independent, interlaced trapezoidal dual arm. Each imaging pad 40 may include a number of microelectrodes (e.g., imaging buttons) and one or more current return electrodes. Any suitable number (e.g., 5, 10, 15, 20, 24, 25, or 26) of imaging buttons may be disposed on each imaging pad 40. In one embodiment, 24 imaging buttons may be disposed on a single imaging pad 40. Also, any suitable number (e.g., 1, 2, 3, 4, or 5) of current return electrodes may be disposed on each imaging pad 40. In one embodiment, 2 current return electrodes may be disposed on one imaging pad 40. Accordingly, in one embodiment, the downhole tool 40 may include 8 imaging pads 40, each including 24 imaging buttons for an array of 192 imaging buttons and 2 current return electrodes. It should be understood that the arrangement and usage of the imaging pads 40 on the various arms may enable generating multi-dimensional high azimuthal and vertical resolution images of the formation 14 and/or the borehole 16.

To perform measurements, an alternating current (AC) voltage is applied between a current return electrode and the array of imaging buttons. The resulting AC current may pass directly through each imaging button. As such, the downhole tool 12 may be equally sensitive to both vertical and horizontal features of the borehole 16 and/or the geological formation 14. In some embodiments, the current may flow from the imaging button through the borehole OBM and geological formation 14 to the two current return electrodes. The imaging pads 40 operate in the MHz range, which may reduce the electrical impedance of the OBM, and enable high-resolution images to be generated based on resistivity, permittivity, standoff (e.g., distance between the imaging button and the wall of the borehole 14 illustrated by arrows 42), relationship between resistivity and permittivity (e.g., Hayman factor), and/or rugosity index, which will be described in detail below. The measured signal at each imaging button may be inversely proportional to the combined impedance of both the formation 14 and the OBM layer. In some embodiments, phase-sensitive signal processing may be applied by the data processing system 28 to separate the OBM and formation signals.

In some embodiments, multiple signals from the imaging buttons may be measured at dense sample rates while maintaining high logging speeds. As such, using the imaging pads 40, the downhole tool 12 may eliminate most systematic noise that may affect measurements in OBM, which may result in a measurement that is more precise. as may be appreciated, the downhole tool 12 may produce a high-fidelity image of the formation 14 and/or borehole 16 by taking accurate and sensitive measurements with the array of small imaging buttons. The data obtained by the imaging pads 40 may be delivered to the data processing system 28 via a telemetry system that may include the transmissions over the cable 18 or wirelessly.

High frequency electrical measurements obtained by the imaging pads 40 may provide more information than low frequency measurements. Through an inversion process using the measurements as input, which is described in detail below, the data processing system 28 may determine formation resistivity and formation permittivity. As may be appreciated, different materials may have different dielectric permittivity values. Thus, the extra information obtained by performing MHz measurements may aid in better identification of formation rocks.

In some embodiments, the data processing system 28 may use a Hayman factor to quantify the relationship between material permittivity and resistivity. The Hayman factor may be defined as:

$$HF = \frac{\text{Permittivity}}{a + b \cdot freq^c \cdot \text{Resistivity}^d} \qquad \text{Equation (1)}$$

Where Permittivity is the permittivity of the formation around the borehole, freq is the measurement frequency, and Resistivity is the resistivity of the formation around the borehole. The coefficients of a, b, c and d can be derived from laboratory measurements. When resistivity and permittivity can be determined for each point in the formation 14 (e.g., each pixel of an image obtained by the downhole tool 12), the Hayman factor may be calculated for each pixel (e.g., characterize the relationship between resistivity and permittivity for each pixel). It should be understood that the Hayman factor is exceptionally sensitive to rock type or lithological variations, and may therefore be used to enable rock type identification in various images, among other things, as described and shown in detail below.

Subsurface porous rock may consist of the following main elements: solid rock matrix, formation water, formation oil and/or gas. Also, in the case of logging or downhole measurements, borehole fluid may play a role by interacting with the rock in the near-wellbore region where measurements may be taken. Examples of such fluids may include air, water-based drilling mud (WBM) or oil-based drilling mud (OBM). Each of the materials may include differing resistivity and/or permittivity. Using the downhole tool 12 and techniques disclosed herein, the resistivity, permittivity, and/or relationship between resistivity and permittivity (e.g., Hayman factor) may be determined and imaged. Additionally, a rugosity index may be determined using measurements from the imaging pads 40, as described next. It should be noted that, in some embodiments, various combinations of the images of permittivity, resistivity, Hayman factor, rugosity index, and/or standoff may provide information related to texture distribution, lithological indicators, and rock type information that enable a high level of classification and identification granularity.

Figure 3A:
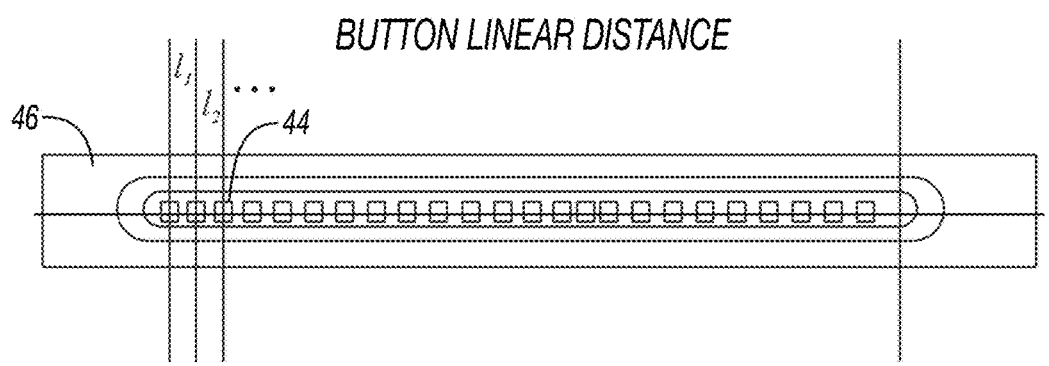
FIGS. 3A, 3B, and 3C illustrate various distances used in a calculation to determine rugosity index, in accordance with an embodiment.
Figure 3B:
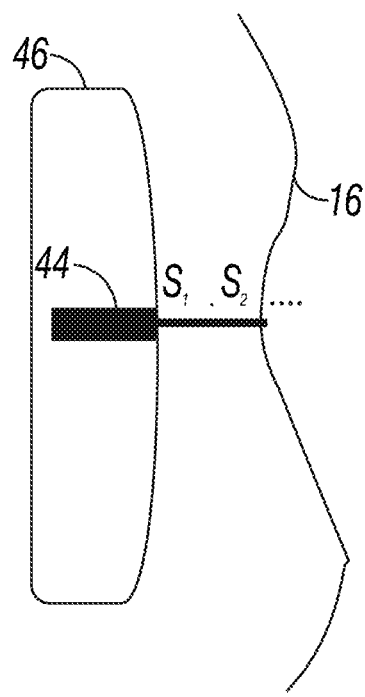
Figure 3C:
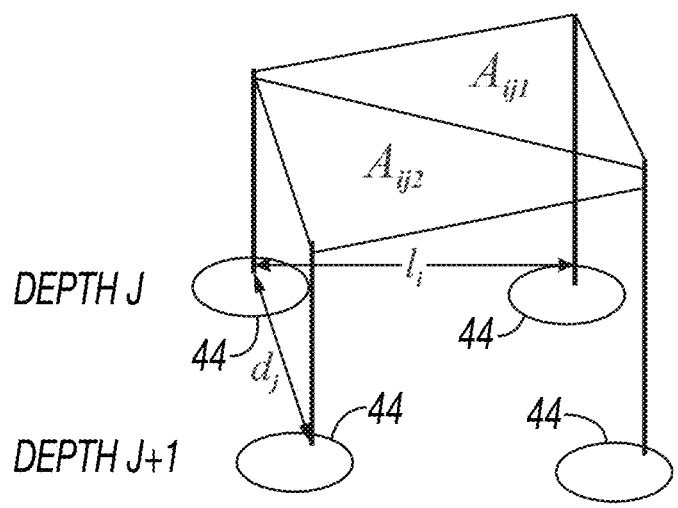

FIGS. 3A, 3B and 3C illustrate various distances used in a calculation to determine rugosity index, in accordance with an embodiment. FIG. 3A is the front view of buttons 44 and the distance between buttons $l_i$, where i is button number from 1 to n (e.g. n is total number of button). FIG. 3B is the side view and the distance between button and borehole surface $S_i$. All the buttons are aligned in this view. FIG. 3C illustrates the construction of triangles $A_{ij1}$ and $A_{ij1}$ used to calculate rock surface finite area.

Rugosity index may refer to two-dimensional (2D) roughness of a rock surface. To determine the rugosity index, the distance between the imaging button surface and the formation surface of the borehole 16 wall (referred to as "standoff" herein) may be determined. As previously discussed, the downhole tool 12 may perform measurements at MHz frequency, which may enable the tool 12 to measure total impedance of the material in front of the imaging buttons. This measurement includes OBM impedance and formation impedance. The relationship may be approximated as:

$$Z_{measurement} = Z_{mud} + Z_{formation} \quad \text{Equation (2)}$$

Where the impedance of mud and formation are complex numbers so that both amplitude and phase need to be considered. Specifically, the impedance of mud is a function of the thickness of mud in front of the button. Using the inversion processing method, the standoff may be determined. Then, a post-processing method can transform standoff distance into the rugosity index using the following equation:

$$bore\,oleRugosityIndex = \frac{boreholeSurfaceArea}{buttonLinearArea} = \frac{\sum_{i=1}^{n}(A_{ij1} + A_{ij2})}{\sum_{i=1}^{n}(l_i\ d_j)} \quad \text{Equation (3)}$$

where $d_j$ is the depth sampling interval between log points and $l_i$ is the distance between neighboring buttons. As a result, $l_i\ d_j$ is the square surface area of an image pixel. $A_{ij1}$ and $A_{ij2}$ are the two projected triangular surface areas on the generally curved borehole surface calculated from the standoff variation. It is easily understood that the bore oleRugosityIndex defined in Equation (3) reflects the borehole rugosity. The rugosity index would be 1.0 if there is no rugosity. However, if the borehole surface is not smooth, the distance between button and borehole surface will not be constant, and the rugosity index will be greater than 1.0. The more the borehole surface varies, the higher the rugosity index will be.

After calculating the rugosity index, the data processing system 28 may combine the rugosity index with the standoff to determine both the distance between the pad and the formation 14 and the general rock smoothness. Such information may aid in distinguishing large pores, such as vugs at the borehole 16 wall that are open to the borehole 16, from vugs that are enclosed behind the borehole 16 wall. In general, the larger the open vugs are, the higher the rugosity index will be and standoff will have larger variations. When there are few isolated vugs or vugs beneath the surface, the rugosity index may be small. Combining the rugosity index and standoff information with an image generated using the Hayman factor may enable identification of vug filling materials.

Figure 4:
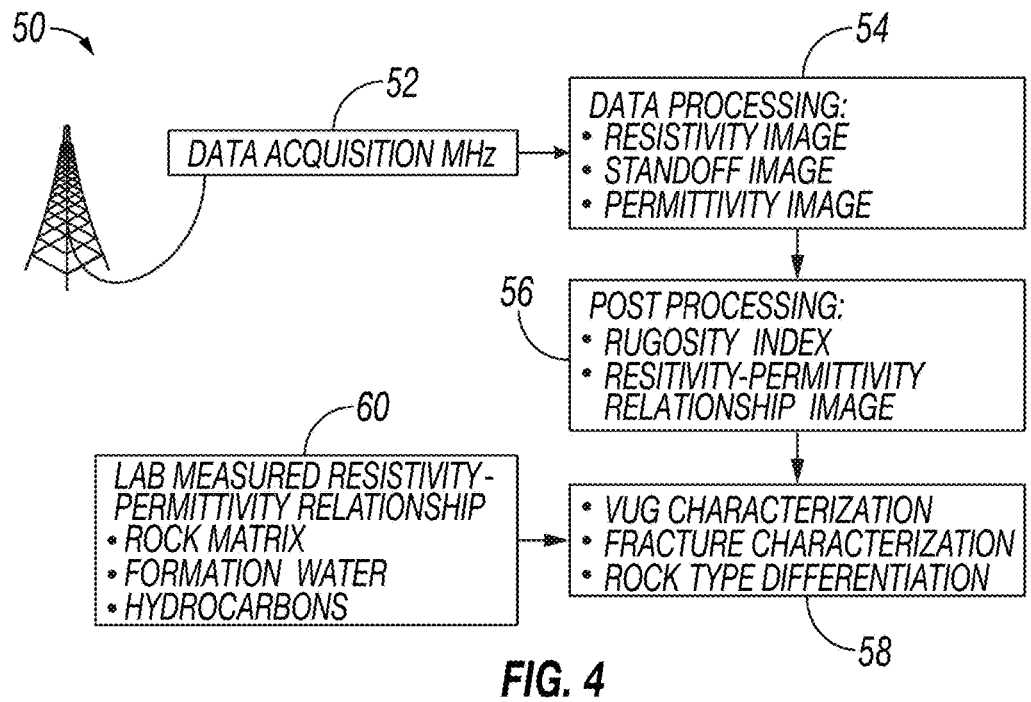
FIG. 4 is a flowchart of a method for identifying textures of formations and types of rocks included in the formations, in accordance with an embodiment.

FIG. 4 is a flowchart of a method 50 for identifying textures of formations 14 and types of rocks included in the formations 14, in accordance with an embodiment. Although the following description of the method 50 is described as being performed by the processor 30 of the data processing system 28, it should be noted that the method 50 may be performed by other processors disposed on other devices that may be capable of communicating with the data processing system 28 and/or the downhole tool 12, such as a computing device or other component associated with the well-logging system 10. Additionally, although the following method 50 describes a number of operations that may be performed, it should be noted that the method 50 may be performed in a variety of suitable orders and all of the operations may not be performed. It should be appreciated that the method 50 may be wholly executed by the data processing system 28 or the execution may be distributed between another computing device (e.g., downhole tool 12) and the data processing system 28. It should be noted that the method 50 may be implemented as computer instructions stored on the memory 38 and/or storage 40.

Referring now to the method 50, the processor 30 may receive (block 52) data in the MHz frequency from the downhole tool 12. The data may be obtained by the one or more imaging pads 40 disposed on the downhole tool 12 as described above. The processor 30 may process the data (block 54) by performing an inversion process to determine formation resistivity, permittivity, and standoff and to generate images for each of the respective characteristic. That is, the processor may perform data processing to generate a resistivity image, a standoff image, and a permittivity image. The inversion process may yield an electrical model obtained through iterative optimization of the resistivity, permittivity, and/or standoff distribution such as to obtain a final model whose response fits equally well (statistically) of the data. In some embodiments, the inversion process may include parameter constraints, a line search scheme, and/or a cost function. Variables used in the inversion process may include formation properties such as the conductivity and permittivity at various frequencies, the sensor standoff, and mud permittivity and conductivity, or phase angel of the mud impedance at various frequencies. The processor 30 may also perform data post-processing (block 56), which may include determining a rugosity index and the relationship between resistivity and permittivity (e.g., Hayman factor) as described above. The Hayman factor may be calculated for each pixel of an image to generate a resistivity-permittivity relationship (e.g., Hayman factor) image.

Each of the images and the rugosity index may provide various information related to texture distribution (e.g., standoff and rugosity index), lithological indicators (e.g., resistivity and permittivity images), and rock type (e.g., Hayman factor and resistivity images). Using the images and rugosity index, the processor 30 may perform (block 58) formation texture and rock type identification (e.g., vug characterization, fracture characterization, rock type differentiation, etc.). In some embodiments, to characterize vugs and/or fractures and differentiate rock types, the processor may receive (block 60) lab measured resistivity, permittivity, and/or resistivity-permittivity relationship (e.g., Hayman factor) for rock matrix, formation water, and/or hydrocarbons. The processor 30 may compare the measured and determined values for resistivity, permittivity, Hayman factor, standoff, and/or rugosity index with the lab measurements to characterize vugs (e.g., open or closed to the surface, large or small, filling material, etc.) and fractures (e.g., type, size, location, etc.) and differentiate various types of rocks in the formation 14. Examples of how the Hayman factor may be used to differentiate rock types is described below. In some embodiments, any of the data described above may be output to a display. For example, the vug and/or fracture characterization, identified rock types, each of the images, the rugosity index, and the like may be output to a display.

Figure 5:
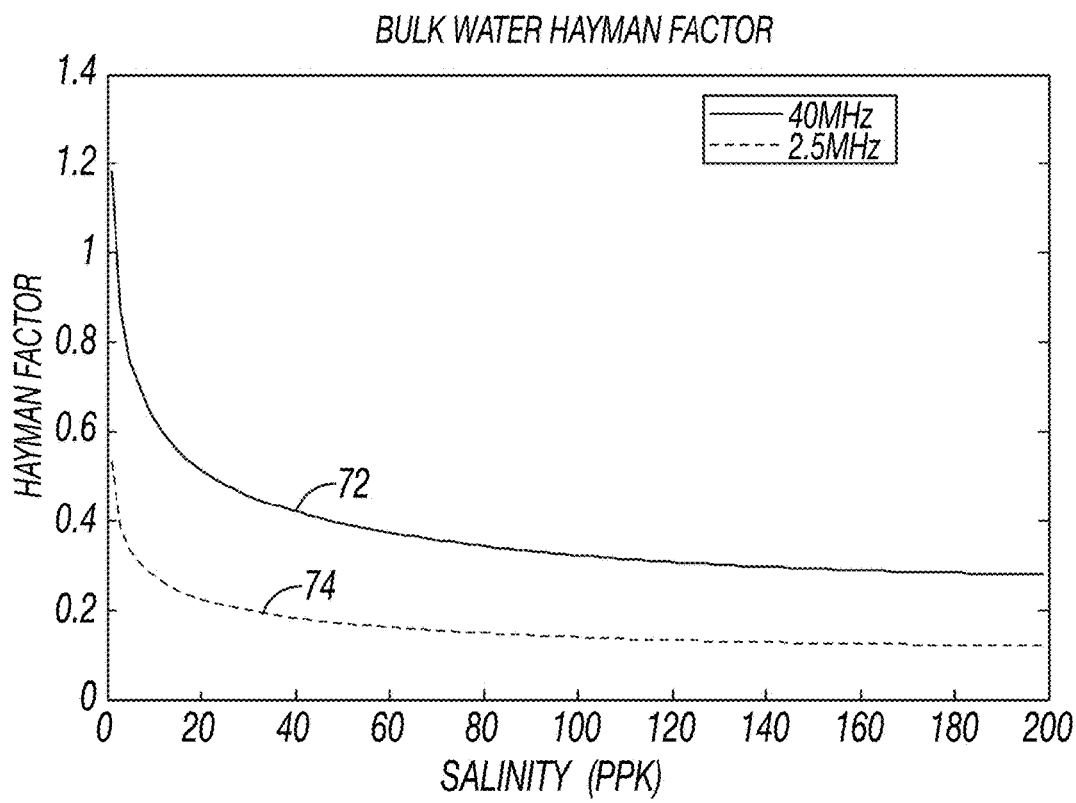
FIG. 5 is a graph of formation bulk water Hayman factor variation with salinity and measurement frequency, in accordance with an embodiment.

FIG. 5 is a graph 70 of formation bulk water Hayman factor variation with salinity and measurement frequency at 150° C., in accordance with an embodiment. As depicted, the y-axis represents the Hayman factor and the x-axis represents the salinity. Two curves represent for two different measurement frequencies: a high frequency (e.g., 40 MHz shown as line 72) and a low frequency (e.g., 2.5 MHz shown as line 74). As the salinity increases, the Hayman factor decreases until leveling out at approximately 0.1 for measurements taken at 2.5 MHz. Likewise, as the salinity increases, the Hayman factor decreases until leveling out at approximately 0.3 for measurements taken at 40 MHz. Accordingly, salinity and the Hayman factor have an inverse relationship for formation water. As may be appreciated, higher frequency measurements may generate higher Hayman factors.

Another rock component that may be accounted for is oil or gas. If one assumes oil or gas conductivity is $1.0 \times 10e^{-6}$ S/m and dielectric constant is 2, then a miniscule Hayman factor may be determined in the order of $7.0 \times 10e^{-4}$. When formation water and oil exist in the rock pore space, there may be interfacial polarization caused by the pore system. Because the downhole tool 12 electrically logs at MHz range frequency, characteristics of the pore system may be reflected in the relationship between rock dielectric permittivity and resistivity. Thus, the Hayman factor is one way to characterize this relationship.

Figure 6:
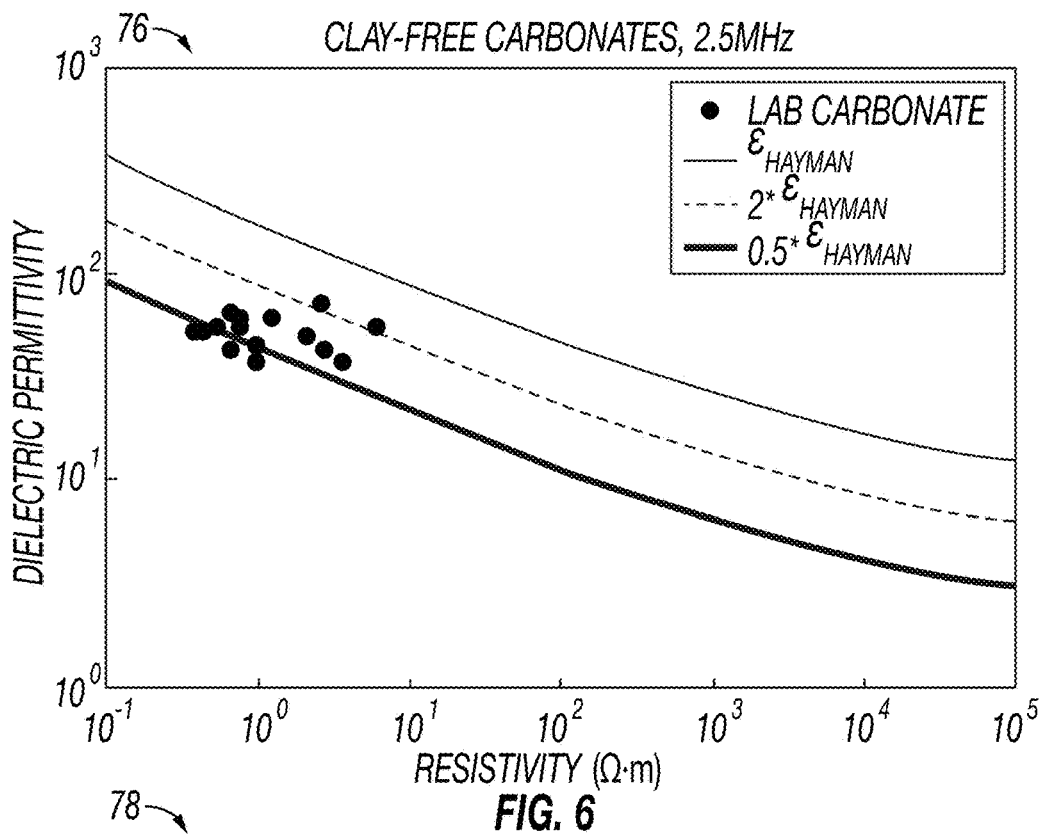
FIG. 6 is a graph of resistivity and dielectric permittivity response in clay-free carbonates, in accordance with an embodiment.
Figure 7:
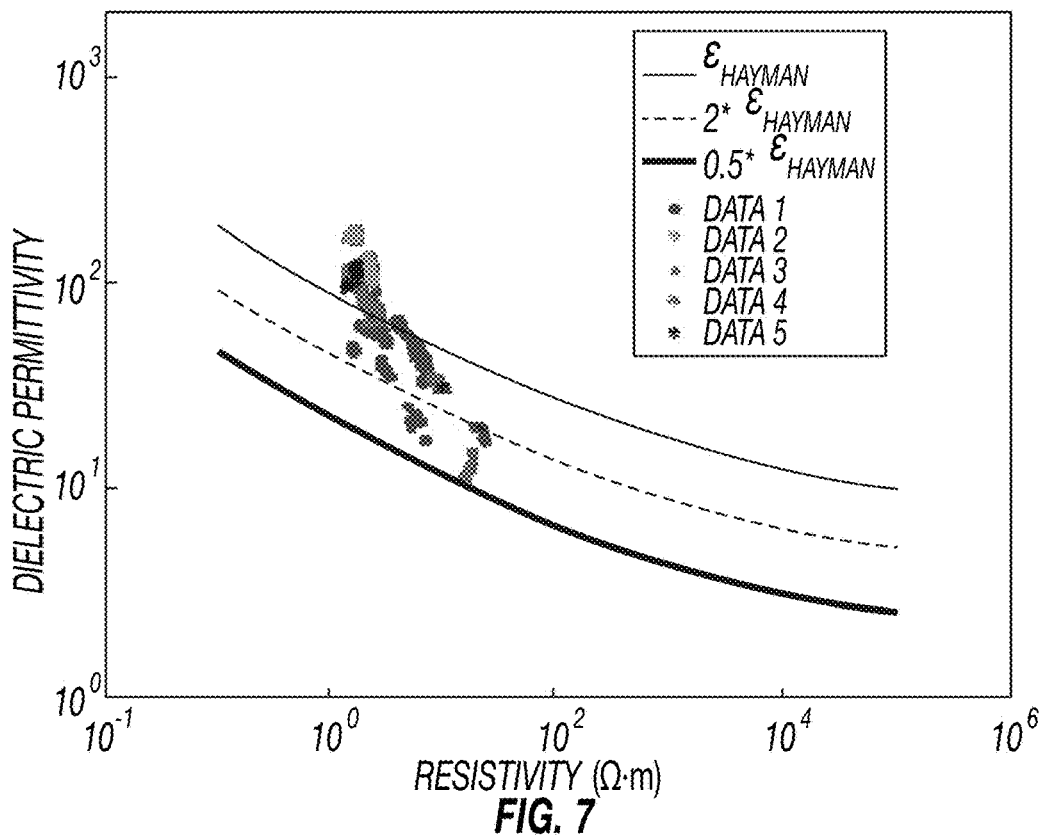
FIG. 7 is a graph of resistivity and dielectric permittivity response in a shale formation, in accordance with an embodiment.
Figures 8, 9:
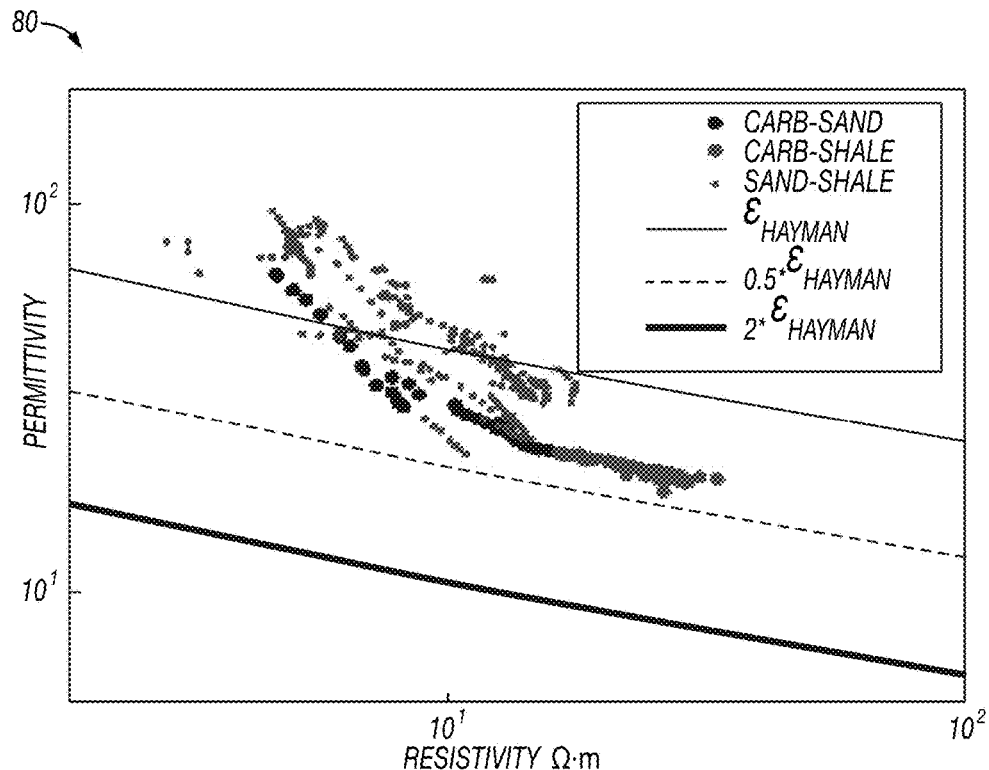
FIG. 8 is a graph of resistivity and dielectric permittivity response in a formation including carbonate-sand, carbonate-shale, and/or sand-shale, in accordance with an embodiment.
FIG. 9 is a table showing calculations on mud Hayman factor at 40 MHz as a function of mud dielectric permittivity and mud phase angle, in accordance with an embodiment.

FIGS. 6-8 are graphs that analyze the resistivity-permittivity relationship for various rock samples and downhole log data in different formations. Each of the graphics represents dielectric permittivity on the y-axis and resistivity on the x-axis. It should be understood that the resistivity and permittivity may be obtained through the inversion process using the MHz measurements obtained from the imaging pads 40 and the relationship between permittivity and resistivity may be quantified using the Hayman factor ($\varepsilon_{Hayman}$) calculation described above.

Beginning with FIG. 6, a graph 76 of resistivity and dielectric permittivity response in clay-free carbonates is shown, in accordance with an embodiment. As depicted on the graph 76, for clay-free carbonate, the data points on the graph have a wide resistivity range, but a small dielectric permittivity range. Accordingly, the trend line is roughly horizontal. Thus, identifying a similar trend line in a formation may enable identifying clay-free carbonate.

FIG. 7 is a graph 78 of resistivity and dielectric permittivity response in a shale formation, in accordance with an embodiment. As depicted in the graph 78, for a shale formation, the trend line is steeper than the trend line for clay-free carbonates meaning that permittivity variation range as well as absolute values for shale formations is larger than clay-free carbonate. That is, the trend line of data points representative of shale (corresponding to DATA 1, DATA 2, DATA 3, DATA 4 and DATA 5 data points on the graph) is roughly vertical. Accordingly, shale has a smaller resistivity variation range than clay-free carbonate. Thus, identifying a similar trend line (e.g., roughly vertical) in a formation may enable identifying shale.

FIG. 8 is a graph 80 of resistivity and dielectric permittivity response in a formation including carbonate-sand, carbonate-shale, and/or sand-shale mixture rocks, in accordance with an embodiment. As depicted in the graph 80, for carbonate-sand, carbonate-shale, and/or sand-shale, the trend line varies depending on which material is present. That is, in different sections of a well where lithology varies from carbonate-sand, carbonate-shale, or sand-shale, the trend line varies depending on the lithology. For example, carbonate-sand and sand-shale have similarly steeper trend lines where the permittivity variation range varies more than the trend line of data points for sand-shale. As depicted, the trend line for sand-shale is generally horizontal, with a wide variation of resistivity range and very little variation of permittivity range. In addition to having a wide variation of permittivity range, the carbonate-sand and carbonate-shale also include a wide variation of resistivity range. Accordingly, using the disclosed techniques may enable identifying different types of lithology in different sections of the well by determining the permittivity, resistivity, and the relationship between permittivity and resistivity.

FIG. 9 is a table 82 showing calculations on mud Hayman factor at 40 MHz as a function of mud dielectric permittivity and mud phase angle, in accordance with an embodiment. The frequency effect of the Hayman factor is small so that when the frequency is decreased by one order of magnitude, the Hayman factor variation is negligible (e.g., occurs at the second digit after the decimal). Further, as depicted in the table 82, the Hayman factor increases as the permittivity increases for each phase angle. Additionally, the Hayman factor decreases for each respective permittivity as the phase angle changes from −90° to −70°.

Figure 10:
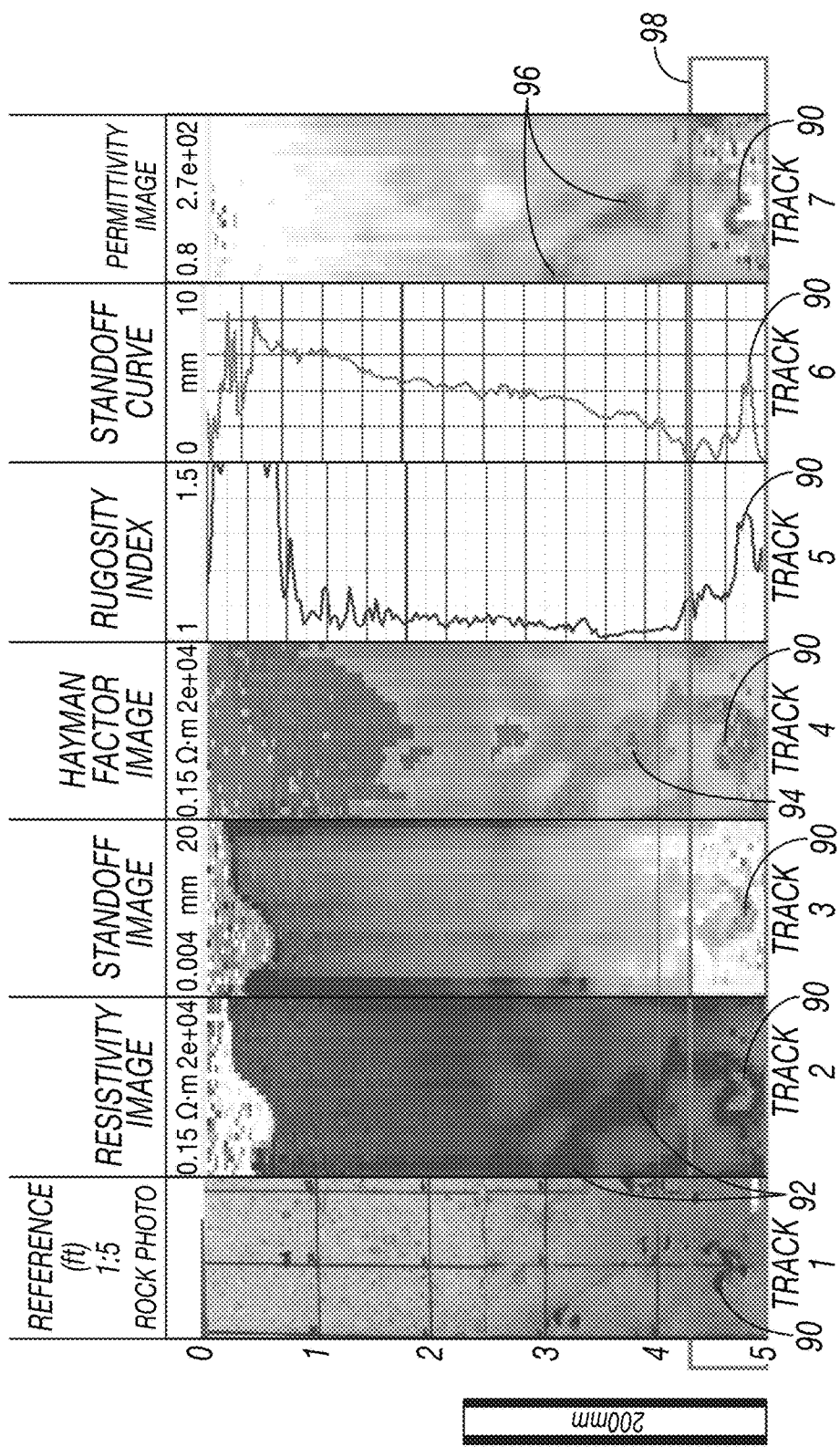
FIG. 10 includes a high resolution photograph of the rock formation, an inverted resistivity image, an inverted standoff image, a Hayman rock image, a rugosity index curve, a standoff curve, and a Hayman factor image that includes a combination of resistivity and permittivity, in accordance with an embodiment.

FIG. 10 includes a high resolution photograph of the rock formation (track 1), an inverted resistivity image (track 2), an inverted standoff image (track 3), a Hayman rock image (track 4) that includes a combination of resistivity and permittivity, in accordance with an embodiment, a rugosity index curve (track 5), a standoff curve (track 6), and a permittivity image (track 7). The images and curves were generated in a lab measurement using the imaging pad 40, the method 50 of FIG. 4, and MHz frequencies of the downhole tool 12 to perform measurements on flat rock surfaces in a controlled laboratory environment. In particular, this is a limestone sample with numerous vugs and saturated with 25 kilo-parts-per-million (kppm) NaCl brine prepared and imaged with the imaging pad 40.

The photograph of the rock formation (track 1) may be used as a visual reference for the size of the sample in feet (1:5) and to relate how the rock texture and/or type are depicted by the images in tracks 2-7. As depicted in the photograph in track 1, there is a large natural vug 90 on the rock surface where standoff indicates the measurements go deeper than the surrounding matrix (bottom of track 6). It should be noted that larger values of standoff on a scale of 0 to 10 millimeters indicate that the imaging pad 40 is farther away from the wellbore 16 surface. Accordingly, the standoff in the middle of the rock in the standoff image (track 6) indicates the distance of the imaging pad 40 is gradually decreasing from top to bottom as the value decreases until the natural vug 90 is encountered. Further, the standoff image (track 3) mirrors the standoff curve (track 6) using a color coded measurement scale. For example, in the standoff image in track 3, lighter colors indicate smaller standoff distance and darker colors indicate larger standoff distance. Thus, the image is darker from 0 to 2 feet where standoff distance is larger and gradually lightens from top to bottom as standoff decreases. As depicted, the natural vug 90 in track 3 is a darker color than the surrounding matrix, which indicates the standoff is greater. At the same portion 92 of the rugosity index curve where the natural vug 90 is located (bottom of track 5), rugosity index is high in the vug area, which indicates that the vug is open to the surface.

Above the vug in the middle of the rock, where standoff gradually increases from the bottom to the top of the rock in track 6, low rugosity index for the same portions (from 4 to 2 feet) of the rock in track 5 indicate a smooth rock surface is detected even though the measurement pad is moving further away from the rock surface as standoff increases. This may indicate that the smoothness of the rock surface is high with a roughness on the order of tens of microns.

Analyzing the resistivity image (track 2), the image shows numerous conductive patches (dark patches 92) above the natural vug 90 that is open to the surface. In some embodiments, the resistivity image (track 2) may be compared with the rugosity index (track 5) and the Hayman rock image (track 4) and/or any other desirable image to determine the characteristics of the rock. For example, low rugosity index from 3 to 4 feet for the conductive patches (dark patches 94) in addition to the high resolution Hayman factor image (track 4), where the conductive patches are dark green and yellow, indicate that the conductive patches are beneath the surface that has different characteristics (e.g., it is of a different rock type) compared to the open vug 90. The difference in rock type may be caused by different vug-filling material. For example, in the open vug 90, oil-based mud (OBM) is invading into the vug while above the open vug 90 there is not much OBM invasion due to the small opening of the vugs or no opening of the vugs to the rock surface. Instead, dark patches in track 2 may indicate that there are vugs beneath the surface because of conductivity due to formation water. Similarly, the high resolution Hayman rock image (track 4) shows that formation water is trapped beneath the surface at the yellow patch 94, which agrees with the dark patch 92 in the resistivity image (track 92).

The Hayman factor image (track 4) that includes a combination of resistivity and permittivity enables visualization of the relationship between the two characteristics. For example, the conductive patches 96 beneath the surface and the natural vug 90 is shown as open to the surface. As previously discussed, the Hayman factor image (track 7) may be generated by calculated the Hayman factor using equation 1 for each pixel of the image. The next figure zooms in on the portion 98 of certain images and curves of tracks 1-7 where the natural vug 90 is located.

Figure 11:
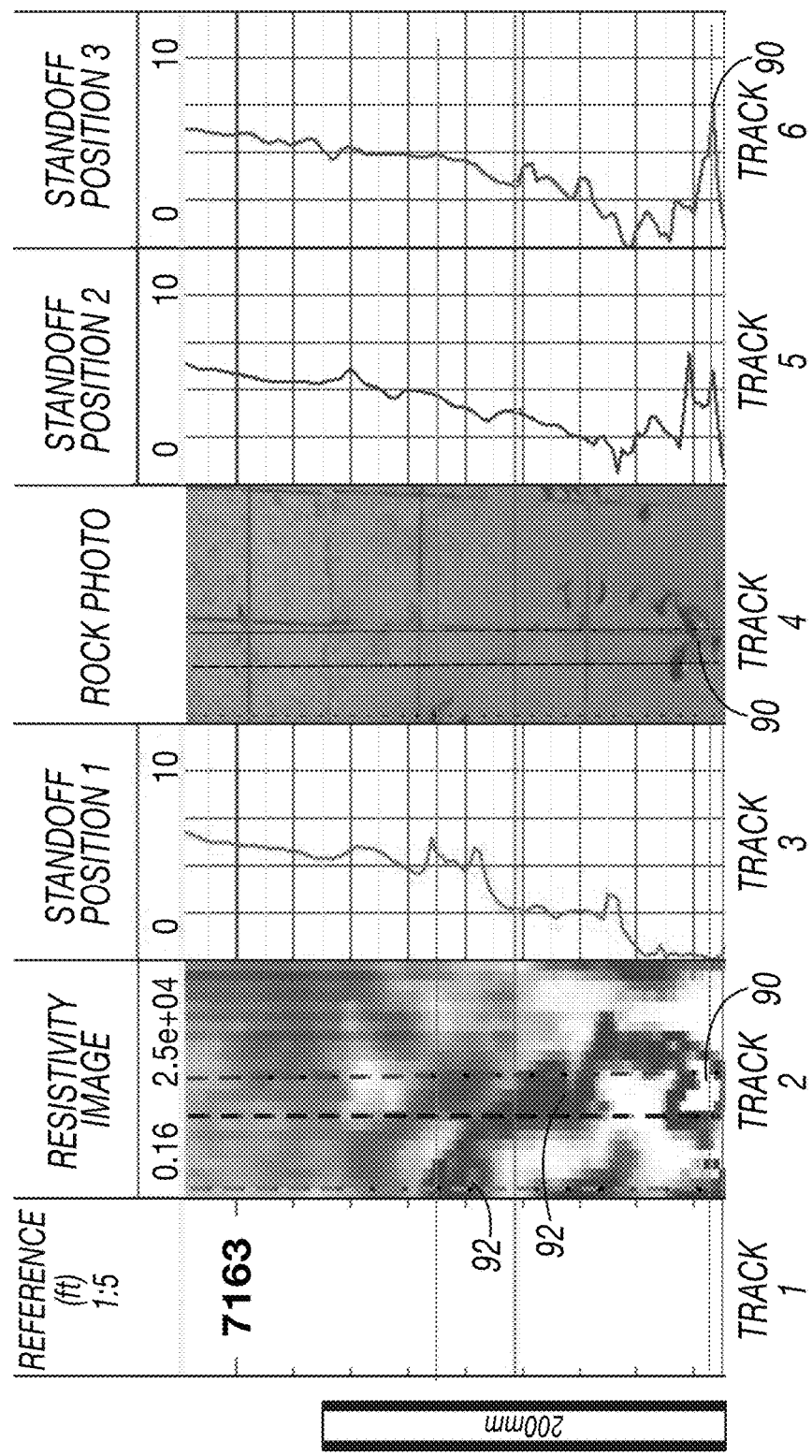
FIG. 11 includes zoomed-in portions of certain images of FIG. 10, in accordance with an embodiment.

FIG. 11 includes zoomed-in portions of certain images of FIG. 10, in accordance with an embodiment. Track 1 includes the reference in feet, track 2 includes the inverted resistivity image The three vertical lines plotted over the image are the three positions where standoff curves are sampled. Track 3 shows the standoff curve generated from measurements obtained from the first imaging button position (button number 1) of the imaging pad 40, track 4 includes the photograph of the rock surface, track 5 includes the standoff curve generated from measurements obtained from the second imaging button position (button number 9) of the imaging pad 40, and track 6 includes the standoff curve generated from measurements obtained from the third imaging button position (button number 12) of the imaging pad 40. As depicted in the resistivity image in track 2, there are vugs beneath the surface of the rock and the natural vug 90 open to the surface. The vugs beneath the surface are characterized by the dark conductive patches 92, as discussed above. On the standoff curves in tracks 3, 5, and 6, the values follow the rock surface variation. For example, vug 92 on the left is intersected by the first red line and the corresponding standoff curve on track 3 clearly shows the existence of vug 92. The standoff curves on tracks 5 and 6 do not intersect with vug 92, they only show very small standoff variations caused by the small rock surface rugosity. However for vug 90, standoff curves on tracks 5 and 6 show large increase of standoff values since they intersect this open vug 90. The standoff curve on track 3 shows only small standoff at the same depth since it does not intersect the same vug and the standoff is measuring the rock surface only.

As may be appreciated, vugs beneath the surface may be difficult to identify by looking at the photograph in track 4 because they are not visible (e.g., beneath the surface). Thus, one benefit of the disclosed techniques enables us to characterize not only vugs open to the borehole surface but also when they are below the borehole surface. Further, using the standoff curve, the techniques enable us to determine how deep an open vug is by measuring the distance from the imaging button to the surface of the rock inside the vug. Even further, the techniques may enable us to characterize the vug-filling material and the surface of the rock, as well as the relationship between permittivity and resistivity using the high resolution Hayman factor image described above.

Figure 12:
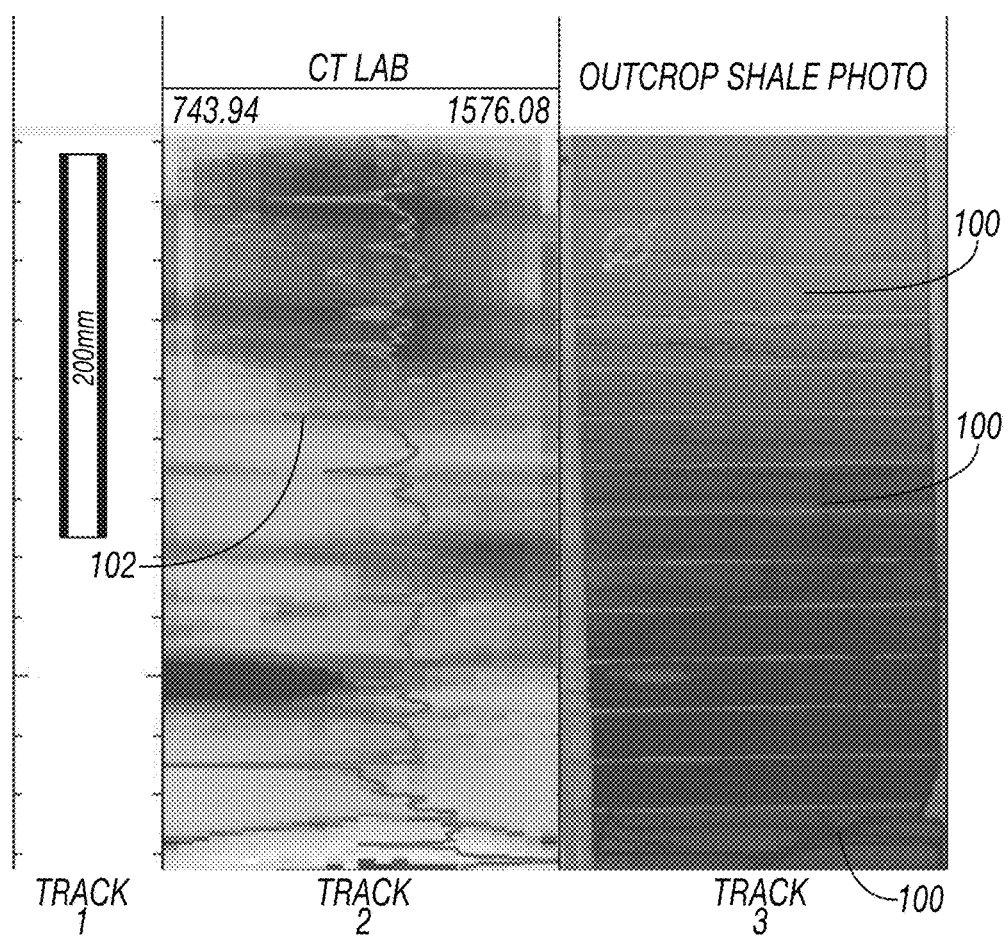
FIG. 12 includes a reference length, an inverted resistivity image overlayed with a computed tomography (CT) scan lab measurement curve that shows a fracture and a photograph of an associated portion of an outcrop core sample, in accordance with an embodiment.

FIG. 12 includes reference of a 200 mm length bar (track 1), an inverted resistivity image overlayed with a computed tomography (CT) scan lab measurement curve that shows a fracture (track 2) and a photograph of an associated portion of a core (track 3). In these images, an outcrop fracture shale sample was imaged using the techniques disclosed herein. As depicted in the photograph in track 3, there are natural or hydration fractures 100 on the rock surface. In some embodiments, a CT scanner may be used to derive a CT number (shown by CT number curve 102) that correlates well with the electrically imaged fracture position, as depicted in track 2. Lower dramatically decreased CT numbers indicate deeper fractures and a small variation baseline CT numbers indicate shallower fractures or no fractures.

Figure 13:
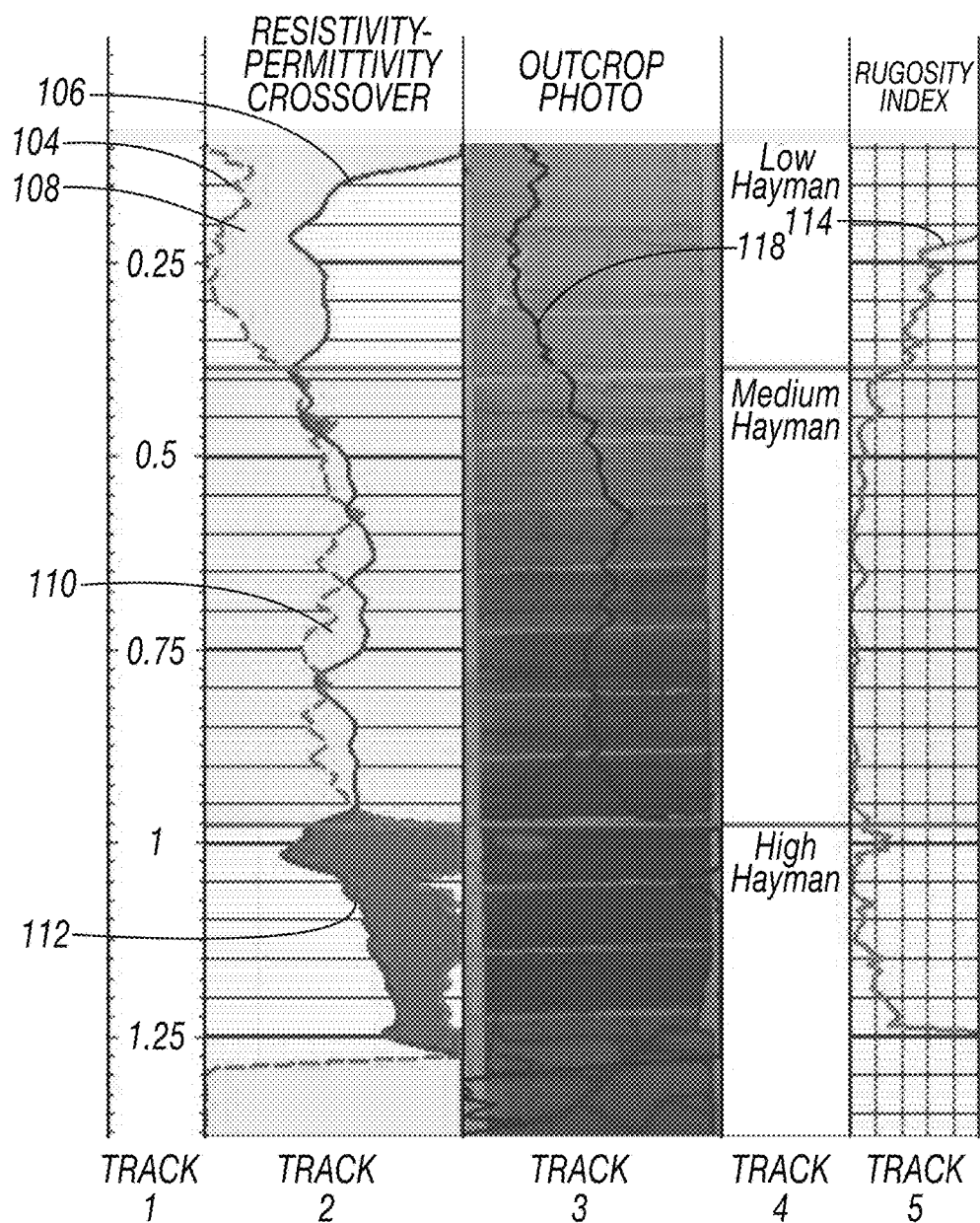
FIG. 13 includes images made up of a combination of images that may be used to delineate various types of rocks, in accordance with an embodiment.

FIG. 13 includes images made up of a combination of images that may be used to delineate various types of rocks, in accordance with an embodiment. These images also analyze the fracture shale sample of FIG. 12. In FIG. 13, track 1 includes a reference in feet, track 2 includes a crossover of permittivity and resistivity by averaging the measurements of the imaging buttons on one imaging pad 40, track 3 includes a photograph of the core overlayed with an average Hayman factor value curve, track 4 includes names of three zones (low Hayman, medium Hayman, High Hayman), track 5 includes the rugosity index curve.

The crossover of a permittivity curve 104 and a resistivity curve 106 in track 2 may be used to identify different zones of the rock and together with Hayman factor curve 118 to characterize the zones. For example, a first crossover zone 108 shows permittivity being much lower than resistivity, which may indicate a first rock type where Hayman Factor 118 is small, a second crossover zone 110 shows permittivity and resistivity being close in value where Hayman Factor 118 is intermediate, which may indicate a second rock type, and a third crossover zone 112 shows permittivity is much higher than resistivity and a very high Hayman Factor curve 118, which may indicate a third rock type. Because the Hayman factor quantifies the relationship between permittivity and resistivity, the Hayman factor value curve 112 overlayed on the photograph on track 3 may be used to indicate how fractures were developed in these three different rock zones. For example, in the low Hayman zone (indicated by track 4), the fractures are mainly horizontal on the rock photo and they appear in 3 separated groups. Only one vertical fracture developed and is trapped between two large horizontal groups. In the medium Hayman zone (indicated by track 4), vertical fractures as well as a ~45 deg slanted fractures developed besides the horizontal fracture groups. However, the fracture events are still mainly horizontal in this zone. In the high Hayman zone (indicated by track 5), the fracture density is higher than the previous two groups and the fracture direction is complex. This means the rock can be broken in any direction. If the fractures are going to conduct fluids, the fluid direction will follow the fracture direction, i.e. in Low Hayman zone fluid flow is mainly horizontal. In Midium Hayman zone fluid flow direction starts to have vertical flow. In Large Hayman zone fluid flow direction will be more complex. Thus the users may divide the rock into 3 zones according to flow direction, as an example of rock type classification. The three Hayman factor zones correspond well to the rock surface rugosity index shown in track 5 where 3 different zones can be identified.

The rugosity index curve 114 is generally higher at the top of the rock and gradually decreases to the bottom of the rock. The rugosity index may indicate the texture of the rock and may be used to identify fractures when the values are larger (e.g., indicates non-smooth surface). In the low Hayman zone (indicated in track 4), the rugosity index is highest in track 5 and gradually decreases from top to bottom, which may indicate the first rock type. In the medium Hayman zone (indicated in track 4), the rugosity index continues to decrease and reaches a lowest point on the curve 114 in track 5, which may indicate the second rock type. In the high Hayman zone (indicated in track 5), the rugosity index begins to increase and fluctuate, which may indicate the third rock type.

The specific embodiments described above have been shown by way of example, and it should be understood that these embodiments may be susceptible to various modifications and alternative forms. It should be further understood that the claims are not intended to be limited to the particular forms discloses, but rather to cover modifications, equivalents, and alternatives falling within the spirit of this disclosure.

The invention claimed is:

1. A method comprising:
    receiving, via a processor, data from a plurality of imaging buttons disposed on a downhole tool within a borehole;
    generating, via the processor, a set of parameters relative to the formation, wherein the set of parameters comprises one or more of a resistivity image, a permittivity image, a standoff curve, a rugosity index curve, a high-resolution image of a relationship between resistivity and permittivity of a section of a geological formation measured by the downhole tool and wherein the set of parameters comprises at least the high-resolution image of a relationship between resistivity and permittivity;
    characterizing, via the processor, one or more vugs, one or more fractures, or some combination thereof based at least on the set of parameters; and
    identifying, via the processor, one or more rock types based at least on the high-resolution image of the relationship between resistivity and permittivity,
    wherein the set of parameters includes the rugosity index curve, wherein the rugosity index curve is calculated in accordance with the following relationship:

$$boreholeRugosityIndex = \frac{\sum_{i=1}^{n}(A_{ij1} + A_{ij2})}{\sum_{i=1}^{n}(l_i \; d_j)}$$

where $d_j$ is the depth sampling interval between log points and $l_i$ is the distance between neighboring imaging buttons, $l_i \, d_j$ is the square surface area of an image pixel, and $A_{ij1}$ and $A_{ij2}$ are the two projected triangular surface areas on the generally curved borehole surface calculated from the standoff variation.

2. The method of claim 1, wherein the method comprises characterizing one or more vugs, wherein characterizing one or more vugs comprises:
    characterizing whether the one or more vugs are open to a surface of the borehole or are closed to the surface; and
    characterizing a filling material of the one or more vugs.

3. The method of claim 1, wherein the method comprises characterizing one or more fractures, wherein characterizing one or more factures comprises characterizing whether the one or more fractures are horizontal or vertical.

4. The method of claim 1, wherein the high-resolution image of the relationship between resistivity and permittivity is generated by calculating a Hayman factor for each pixel of an image of the section of a geological formation, wherein the Hayman factor is calculated in accordance with the following relationship:

$$HF = \frac{Permittivity}{a + b \;\; freq^c \;\; Resistivity^d}$$

where Permittivity is permittivity of the formation surround the borehole, freq is a frequency of measurement, Resistivity is a resistivity of the formation surround the borehole and coefficients a, b, c and d can be determined from laboratory measurements.

5. The method of claim 1, wherein the received data is in a megahertz range of frequency.

6. The method of claim 1, wherein the set of parameters includes at least one of the resistivity image, the permittivity image and the standoff image, wherein the at least one of the resistivity image, the permittivity image, and the standoff image is generated using inversion.

7. The method of claim 1, comprising:
    receiving, via the processor, subsequent data including a relationship of resistivity and permittivity measured in a lab; and
    comparing the subsequent data to the high-resolution image of the relationship between resistivity and permittivity to identify the one or more rock types.

8. The method of claim 1, wherein the set of parameters includes the standoff image, the method comprising measuring the total impedance of material in front of the imaging buttons when generating the standoff image.

9. A system, comprising:
    a downhole tool comprising a plurality of imaging buttons; and
    a data processing system comprising a processor configured to:
        receive data from the plurality of imaging buttons;

generate a high-resolution image of a relationship between resistivity and permittivity of a section of a geological formation measured by the plurality of imaging buttons; and identify one or more rock types based at least on the high-resolution image of the relationship between resistivity and permittivity, wherein the processor is configured to generate at least a rugosity index curve and a high-resolution image of a relationship between resistivity and permittivity and to characterize one or more vugs based at least on the rugosity index curve and the high-resolution image of the relationship between resistivity and permittivity, wherein characterizing one or more vugs includes :

characterizing whether the one or more vugs are open to a surface of the borehole or are closed to the surface based on the rugosity index curve; and characterizing a filling material of the one or more vugs based on the rugosity index curve and the high-resolution image of the relationship between resistivity and permittivity.

10. The system of claim 9, wherein the processor is configured to characterize one or more fractures, wherein characterizing one or more fractures includes characterizing whether the one or more fractures are horizontal or vertical.

11. The system of claim 9, wherein the plurality of imaging buttons are configured to obtain measurements at megahertz frequencies.

12. The system of claim 9, wherein the rugosity index curve indicates a smoothness of a surface of the section of the geological formation.

13. The system of claim 9, wherein the processor identifies one or more rock types based on different vug filling materials visualized in the high-resolution image by different colors.

14. A tangible, non-transitory computer-readable medium storing instructions that, when executed by a processor, cause the processor to:

receive data from a plurality of imaging buttons disposed on a downhole tool, wherein the data comprises megahertz range frequency measurements and the imaging buttons are measuring a section of a borehole;

generate at least a rugosity index curve and a high-resolution image of a relationship between resistivity and permittivity; and characterize one or more vugs based at least on the rugosity index curve and the high-resolution image of the relationship between resistivity and permittivity, wherein characterizing the one or more vugs comprise :

characterize whether the one or more vugs are open to a surface of the section or are closed to the surface based on the rugosity index curve; and characterize a filling material of the one or more vugs based on the rugosity index curve and the high-resolution image of the relationship between resistivity and permittivity.

15. The computer readable medium of claim 14, wherein the instructions, when executed by the processor, cause the processor to identify one or more rock types based at least on the high-resolution image of the relationship between resistivity and permittivity.

* * * * *